(12) United States Patent
Nissen et al.

(10) Patent No.: US 9,416,890 B2
(45) Date of Patent: Aug. 16, 2016

(54) FLOW CONTROL VALVE AND A METHOD OF ASSEMBLING A FLOW CONTROL VALVE

(75) Inventors: Birthe Reese Nissen, Nordborg (DK); John Porland, Sydals (DK); Ejner Kobberoe Andersen, Nordborg (DK); Johan Van Beek, Almind (DK); Michael Birkelund, Middelfart (DK); Marcin Abramowicz, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 13/878,037

(22) PCT Filed: Oct. 5, 2011

(86) PCT No.: PCT/DK2011/000109
§ 371 (c)(1),
(2), (4) Date: Apr. 22, 2013

(87) PCT Pub. No.: WO2012/045310
PCT Pub. Date: Apr. 12, 2012

(65) Prior Publication Data
US 2013/0207014 A1      Aug. 15, 2013

(30) Foreign Application Priority Data
Oct. 6, 2010   (DK) .................................. 2010 00905

(51) Int. Cl.
*F16K 31/04*    (2006.01)
*F16K 27/02*    (2006.01)
(Continued)

(52) U.S. Cl.
CPC .................. *F16K 31/047* (2013.01); *F16K 1/02* (2013.01); *F16K 27/029* (2013.01); *F16K 31/04* (2013.01); *F16K 99/00* (2013.01); *Y10T 137/0491* (2015.04)

(58) Field of Classification Search
CPC ....... F16K 1/02; F16K 27/029; F16K 31/043; F16K 31/047
USPC .................. 251/129.11, 266, 267, 268, 30.04, 251/129.22
See application file for complete search history.

(56) References Cited

U.S. PATENT DOCUMENTS 2,228,849 A * 1/1941 Sandos et al. .................... 403/50
5,052,656 A * 10/1991 Katayama ................ 251/129.11
(Continued)

FOREIGN PATENT DOCUMENTS

| CN | 1985118 A | 6/2007 |
|---|---|---|
| CN | 101825186 A | 9/2010 |

(Continued)

OTHER PUBLICATIONS

PCT Search Report for PCT Serial No. PCT/DK2011/000109 dated Jan. 19, 2012.

*Primary Examiner* — Matthew W Jellett
(74) *Attorney, Agent, or Firm* — McCormick, Paulding & Huber LLP

(57) ABSTRACT

A flow control valve (1) and a method for assembling a flow control valve (1) are disclosed. The flow control valve (1) comprises a first housing part (2) and a second housing part (3) attached directly to each other, in such a manner that the first housing part (2) and the second housing part (3) form a substantially closed housing. The first housing part (2) defines a first flow section (4), a second flow section (5), a connecting port (6) fluidly interconnecting the first flow section (4) and the second flow section (5), and a valve seat (7) arranged at the connecting port (6). The flow control valve (1) further comprises a frame part (9) arranged in an interior part of the housing formed by the first housing part (2) and the second housing part (3), the frame part (9) having mounted thereon a valve element (10, 13) arranged movably relative to the valve seat (7), a moving mechanism, e.g. including a spindle (12), for moving the valve element (10, 13), and an actuating mechanism, e.g. a stepper motor (14), for operating the moving mechanism. The frame part (9) is attached directly to the first housing part (2) or to the second housing part (3). The frame part (9) along with the components mounted thereon can be mounted on the first (2) or second (3) housing part during the assembly of the flow control valve (1). The final assembly step thereby only includes attaching the first (2) and second (3) housing parts to each other. This makes the assembly process easy, thereby reducing the risk of errors.

12 Claims, 6 Drawing Sheets

(51) Int. Cl.
*F16K 1/02* (2006.01)
*F16K 99/00* (2006.01)

(56) References Cited

U.S. PATENT DOCUMENTS

| | | | | |
|---|---|---|---|---|
| 5,060,910 A | * | 10/1991 | Iwata et al. | 251/129.05 |
| 5,318,272 A | * | 6/1994 | Smith | 251/129.12 |
| 5,364,066 A | * | 11/1994 | Dorste et al. | 251/122 |
| 5,950,674 A | * | 9/1999 | Wylie et al. | 137/597 |
| 6,460,567 B1 | | 10/2002 | Hansen, III et al. | |
| 6,561,480 B1 | * | 5/2003 | Komiya et al. | 251/129.12 |
| 6,568,656 B1 | * | 5/2003 | Wrocklage | 251/282 |
| 7,240,694 B2 | | 7/2007 | Johnsen et al. | |
| 8,235,354 B2 | * | 8/2012 | Nalini et al. | 251/129.07 |
| 8,333,363 B2 | * | 12/2012 | Nalini et al. | 251/129.11 |
| 2006/0005890 A1 | | 1/2006 | Johnsen et al. | |
| 2009/0223572 A1 | * | 9/2009 | Roschke et al. | 137/489 |

FOREIGN PATENT DOCUMENTS

| | | |
|---|---|---|
| EP | 1 715 231 A1 | 10/2006 |
| EP | 2 226 697 A1 | 9/2010 |
| JP | 2009030696 A | 2/2009 |
| WO | 00/20145 A1 | 4/2000 |

* cited by examiner

FLOW CONTROL VALVE AND A METHOD OF ASSEMBLING A FLOW CONTROL VALVE

CROSS REFERENCE TO RELATED APPLICATIONS

This application is entitled to the benefit of and incorporates by reference essential subject matter disclosed in International Patent Application No. PCT/DK2011/000109 filed on Oct. 5, 2011 and Danish Patent Application No. PA 2010 00905 filed Oct. 6, 2010.

FIELD OF THE INVENTION

The present invention relates to a flow control valve, in particular a flow control valve for a vapour compression system, such as a refrigeration system or a heat pump. More particularly, the flow control valve of the present invention is easier to assemble than prior art flow control valves. The present invention further relates to a method for assembling a flow control valve.

BACKGROUND OF THE INVENTION

Flow control valves are used for controlling fluid flows in a variety of applications. For instance, in vapour compression systems, such as refrigeration systems, air condition systems or heat pumps, flow control valves are, e.g., used for controlling a supply of refrigerant to an evaporator. In this case the flow control valve may be in the form of an expansion valve. Flow control valves may also be used for controlling a flow of refrigerant in a suction line of a vapour compression system, i.e. downstream relatively to an evaporator. In this case the flow control valve functions as a suction valve.

U.S. Pat. No. 7,240,694 B2 discloses a flow control valve for a refrigeration system. The flow control valve comprises a valve body defining a fluid inlet section, a fluid outlet section, and a connecting port interconnecting the inlet and outlet sections. A valve unit is movable to selectively opening and closing the valve port, thereby controlling the fluid flow between the fluid inlet section and the fluid outlet section.

The flow control valve of U.S. Pat. No. 7,240,694 B2 is made from a number of separate parts. When the flow control valve is assembled these separate parts are attached to the valve, one by one, at the operating site of the flow control valve. This is cumbersome and makes it difficult to manage the individual parts of the flow control valve.

SUMMARY OF THE INVENTION

It is an object of embodiments of the invention to provide a flow control valve which is easier to assemble than prior art flow control valves.

It is a further object of embodiments of the invention to provide a flow control comprising fewer main parts than prior art control valves, without compromising the operability of the flow control valve.

It is an even further object of embodiments of the invention to provide a method for assembling a flow control valve, the method being easier to perform than prior art assembly methods.

According to a first aspect the invention provides a flow control valve comprising:

a first housing part defining a first flow section, a second flow section, a connecting port fluidly interconnecting the first flow section and the second flow section, and a valve seat arranged at the connecting port, a second housing part being attached directly to the first housing part, in such a manner that the first housing part and the second housing part form a substantially closed housing, a frame part arranged in an interior part of the housing formed by the first housing part and the second housing part, the frame part having mounted thereon a valve element arranged movably relative to the valve seat, a moving mechanism for moving the valve element, and an actuating mechanism for operating the moving mechanism, the frame part further being attached directly to the first housing part or to the second housing part.

In the present context the term 'flow control valve' should be interpreted to mean a valve which is adapted to control a flow of fluid, such as a liquid flow, a gaseous flow or a flow of fluid in a mixed state. The valve may be adapted to prevent or allow such a flow and/or the valve may be adapted to control the flow rate. Flow control valves are, e.g., used in vapour compression systems, such as refrigeration systems, air condition systems or heat pumps, e.g. for controlling a supply of refrigerant to an evaporator or for controlling a refrigerant flow in a suction line.

The flow control valve comprises a first housing part and a second housing part. The first housing part defines a first flow section, a second flow section and a connecting port. The connecting port fluidly interconnects the first flow section and the second flow section. Thereby fluid may flow from the first flow section to the second flow section, or vice versa, via the connecting port. A valve seat is arranged at the connecting port. The function of this will be described below.

The second housing part is attached directly to the first housing part, in such a manner that a substantially closed housing is formed. This should be interpreted to mean that the first and second housing part, when attached to each other, define a cavity which is substantially enclosed by wall parts of the first and second housing parts. Accordingly, the first and second housing parts, when attached to each other, form a unit defining a cavity in which other parts of the flow control valve can be accommodated. Furthermore, the first and second housing parts are attached directly to each other, i.e. they form interfaces towards each other, and no intermediate parts are arranged between the first housing part and the second housing part.

The flow control valve further comprises a frame part. In the present context the term 'frame part' should be interpreted to mean a structural part being capable of carrying or supporting other parts of the flow control valve.

The frame part is arranged in an interior part of the housing formed by the first housing part and the second housing part, i.e. it is arranged in the cavity defined by the first housing part and the second housing part, and the frame part is enclosed by wall parts of the first and second housing parts.

A valve element, a moving mechanism and an actuating mechanism are mounted on the frame part. The valve element is mounted in such a manner that it is movable relative to the valve seat arranged at the connecting port. Thereby the mutual position of the valve element and the valve seat determines the fluid flow from the first flow section to the second flow section, or vice versa, via the connecting port. The moving mechanism is arranged to move the valve element, and the actuating mechanism is arranged to operate the moving mechanism. Accordingly, the fluid flow from the first flow section to the second flow section, or vice versa, via the connection port, can be controlled by controlling the actuating mechanism which in turn causes the moving mechanism to move the valve element to a desired position relative to the valve seat, said desired mutual position defining a desired flow rate.

The frame part is attached directly to the first housing part or to the second housing part. Thereby the frame part, along with the valve element, the moving mechanism and the actuating mechanism mounted thereon, can be attached to the first/second housing part before the first housing part and the second housing part are attached to each other. This may even be performed at an assembly line arranged remotely from the operating site of the flow control valve. Consequently, the final assembly step performed at the operating site of the flow control valve when the valve is installed requires only attaching the first and second housing parts to each other. This is very simple, and the risk of performing errors during the assembly is considerably reduced. Furthermore, it is much easier and more cost effective to perform the complicated part of the assembly process at an assembly line, than it is to perform it at the operating site, where space may be limited, access angles may be awkward, and personnel may not be specialized.

The flow control valve may further comprise a connector part establishing electrical connections between an interior part of the housing and the exterior of the housing. The connector part may, e.g., establish electrical connections between an exterior power supply and power consuming components arranged in an interior part of the housing, e.g. the actuating mechanism. It may also establish electrical connections between sensor devices arranged in the interior part of the housing and measuring or monitoring equipment arranged exterior of the housing.

The connector part may advantageously be helium leak tight. This should be interpreted to mean that the connector part is sufficiently tight to pass a standard helium leak test. Preferably, the housing defined by the first housing part and the second housing part, as well as any assemble interfaces of the flow control valve may be helium leak tight.

The frame part may define a central cavity and a peripheral cavity. In this case the moving mechanism may be at least partly accommodated in the central cavity of the frame part, and the movable valve element may be at least partly accommodated in the peripheral cavity of the frame part. This construction provides a compact design of the flow control valve, in particular because the movements of the valve element take place in the peripheral cavity, and the available space in the interior part of the housing is thereby utilised in a very efficient manner. As an alternative construction, it may be envisaged that the moving mechanism may be at least partly accommodated in the peripheral cavity of the frame part, and that the movable valve element may be at least partly accommodated in the central cavity of the frame part.

The frame part and the first or second housing part may be attached to each other by means of a snap fit connection. According to this embodiment, it is very easy to attach the frame part, along with the valve element, moving mechanism and actuator mechanism mounted thereon, to the first/second housing part. Furthermore, this step does not require the use of any tools.

The actuating mechanism may be or comprise a stepper motor. Alternatively, the actuating mechanism may be or comprise other suitable actuating means, such as any kind of electric motor, e.g. an electric solenoid motor.

The moving mechanism may be adapted to converting a rotational movement of the actuating mechanism into a translational movement of the valve element. According to this embodiment the actuating mechanism may be or comprise a rotating motor. The translational movements of the valve element may advantageously be substantially along a direction towards and away from the valve seat.

The moving mechanism may comprise a spindle with a threaded portion, said threaded portion being adapted to engage a mating threaded portion arranged on a part of the valve element. In the case that the spindle is substantially fixed relative to the housing, and thereby to the valve seat, the valve element will perform a translational movement relative to the valve seat when the spindle or the valve element is rotated, due to the engaging mating threaded portions. The spindle may be provided with an outer thread, in which case a part of the valve element is provided with a mating inner thread. Alternatively, the spindle may be provided with an inner thread, in which case a part of the valve element is provided with an outer thread.

The flow control valve may further comprise means for preventing relative rotational movements between the frame part and the valve element. According to this embodiment, the valve element is prevented from rotating along when the actuating means performs rotational movements, and the rotational movements are thereby converted into translational movements of the valve element in an efficient and precise manner. The means for preventing relative rotational movements between the frame part and the valve element may, e.g., comprise mating protrusions and recesses formed on the frame part and the valve element, respectively. The protrusions and recesses may have an elongated form, the recesses e.g. being in the form of grooves, along the direction defined by the translational movement of the valve element. Such an arrangement is sometimes referred to as a spline connection. As an alternative, mating protrusions and recesses may be formed on a wall part of the first or second housing part and the valve element, respectively.

The second housing part may be releasably attached to the first housing part, e.g. by means of one or more screws or bolt and nut connections, or by means of a snap fit connection. In this case a gasket may advantageously be arranged at the connection between the housing parts in order to ensure sufficient tightness of the housing. As an alternative, the second housing part may be attached to the first housing part in a non-reversible manner, e.g. by means of welding, soldering or swaging.

It should be noted that the present invention should also be interpreted as covering a flow control valve comprising one inlet opening and two or more outlet openings. In this case the flow control valve is capable of distributing a flow of refrigerant received via the inlet opening among the two or more outlet openings. The flow control valve may comprise two or more valve seats and two or more valve elements, the number of valve seats and valve elements corresponding to the number of outlet openings. The flow control valve may comprise two or more frame parts, or all of the valve elements may be mounted on a single frame part.

According to a second aspect the invention provides a method for assembling a flow control valve, the method comprising the steps of:

providing a first housing part defining a first flow section, a second flow section, a connecting port fluidly interconnecting the first flow section and the second flow section, and a valve seat arranged at the connecting port, providing a frame part, mounting a movable valve element, a moving mechanism for moving the valve element, and an actuating mechanism for operating the moving mechanism on the frame part, attaching the first housing part or a second housing part to the frame part, and attaching the first housing part and the second housing part to each other in such a manner that a substantially closed housing is formed, and in such a manner that the frame part along with the movable valve part, the moving mechanism and the actuating mechanism are arranged in an interior part of the housing.

It should be noted that a skilled person would readily recognise that any feature described in combination with the first aspect of the invention could also be combined with the second aspect of the invention, and vice versa.

According to the method of the second aspect of the invention, a first housing part and a frame part are initially provided. The first housing part defines a first flow section, a second flow section, a connecting port and a valve seat, similarly to the first housing part described above with reference to the first aspect of the invention. The remarks set forth above is equally applicable here.

Next, a movable valve element, a moving mechanism for moving the valve element, and an actuating mechanism for operating the moving mechanism are mounted on the frame part. Thereby a single unit comprising all of these elements is formed.

Subsequently, the first housing part or a second housing part is attached to the frame, which is already carrying the elements which were mounted thereon during the previous method step. As a consequence, two main units are provided, i.e. the first housing part and the second housing part, the frame part forming part of one of the main units.

Finally, the first housing part and the second housing part are attached to each other. This is performed in such a manner that a substantially closed housing is formed, and in such a manner that the frame part along with the movable valve part, the moving mechanism and the actuating mechanism are arranged in an interior part of the housing.

It is an advantage that the valve part, the moving mechanism and the actuating mechanism are mounted on the frame part, and that the frame part is subsequently attached to one of the housing parts before the housing parts are attached to each other to form the final flow control valve, because this makes the manufacturing process easy, and because it minimises the number of assembling steps and the number of parts at the operating site of the flow control valve. Therefore the manufacturing process is efficient and cost effective, and the risk of errors during the assembly of the flow control valve is minimised. Furthermore, it allows the major part of the assembly process to take place at a manufacturing site. This makes the assembly process easy and cost effective, and it minimises the risk of errors, as described above.

The method may further comprise the step of fixing the frame part to a manufacturing table prior to performing the mounting step, and the mounting step may be performed while the frame part is fixed to the manufacturing table. According to this embodiment, the frame part is kept in a fixed position while the mounting step is performed. Furthermore, the frame part may be kept in a position and an orientation which makes it as easy as possible to perform the mounting step. This facilitates the manufacturing process. Finally, the mounting step may be performed in a location which is remote from the operating site of the flow control valve, such as at a manufacturing site. This makes the manufacturing process efficient and cost effective, as described above.

The mounting step may further comprise mounting a connector part on the frame part, said connector part establishing electrical connections between an interior part of the housing and the exterior of the housing. As described above with reference to the first aspect of the invention, the connector part may, e.g., establish electrical connections between an external power source and power requiring components arranged in the interior part of the housing, e.g. the actuating mechanism. Alternatively or additionally, the connector part may establish electrical connections between one or more sensing devices arranged in the interior part of the housing and measuring or monitoring equipment arranged exterior of the housing.

The flow control valve being assembled by means of the method may advantageously be a flow control valve according to the first aspect of the invention.

BRIEF DESCRIPTION OF THE DRAWINGS

The invention will now be described in further detail with reference to the accompanying drawings in which.

DETAILED DESCRIPTION

Figure 1:
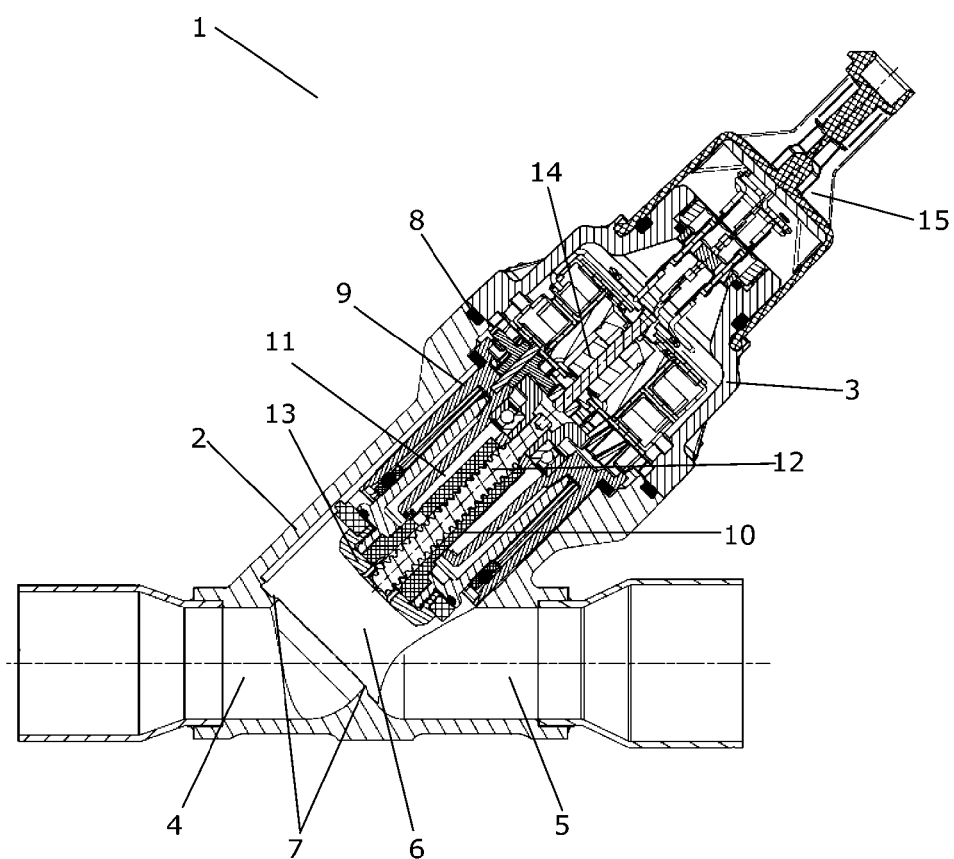
FIGS. 1-3 are cross sectional views of a flow control valve according to a first embodiment of the invention, in a fully open, a partly open and a fully closed position, respectively.
Figure 2:
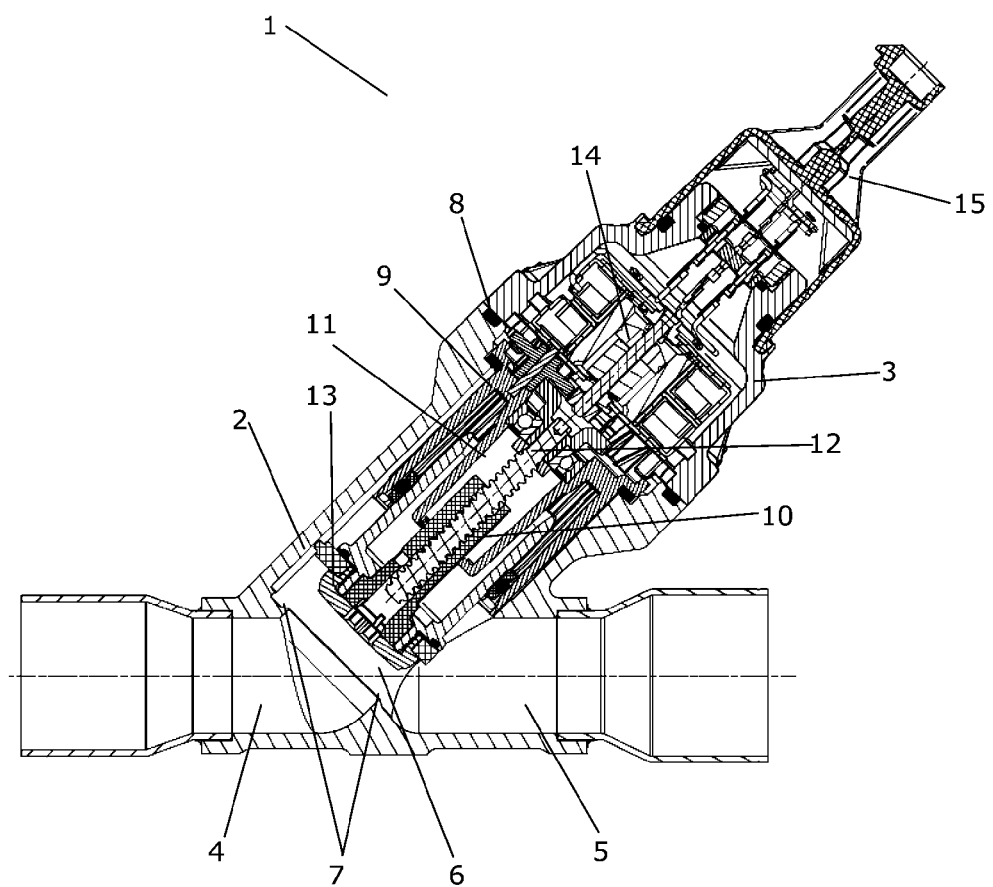
Figure 3:
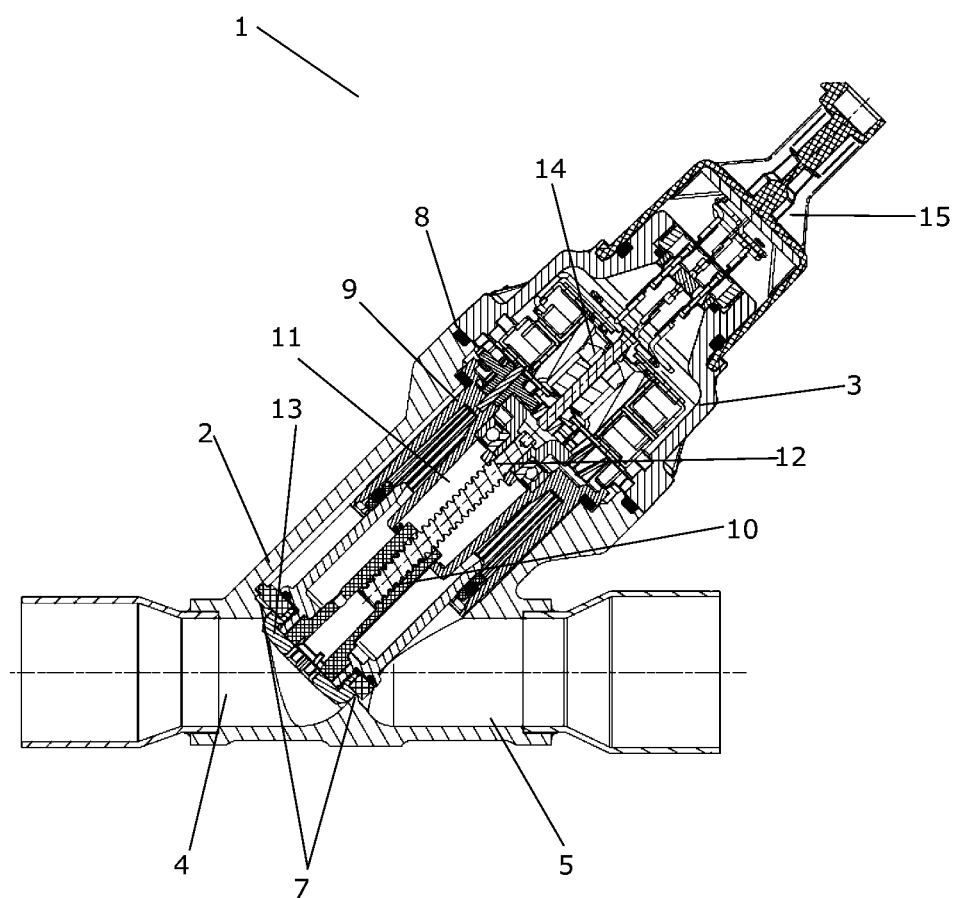

FIGS. 1-3 are cross sectional views of a flow control valve 1 according to a first embodiment of the invention. In FIG. 1 the flow control valve 1 is shown in a fully open position, in FIG. 2 the flow control valve 2 is shown in a partly open position, and in FIG. 3 the flow control valve 1 is shown in a fully closed position. This will be explained further below.

The flow control valve 1 comprises a first housing part 2 and a second housing part 3. The first housing part 2 defines a first flow section 4 and a second flow section 5. A connecting port 6 fluidly interconnects the first flow section 4 and the second flow section 5, and a valve seat 7 is arranged at the connecting port 6.

During operation of the flow control valve 1, the first flow section 4 may operate as a fluid inlet of the flow control valve 1, and the second flow section 5 may operate as a fluid outlet of the flow control valve 1. In this case, the first flow section 4 receives fluid from a fluid source. The fluid flows towards the second flow section 5, via the connection port 6, and leaves the flow control valve 1 via the second flow section 5. As an alternative, the second flow section 5 may operate as a fluid inlet, and the first flow section 4 may operate as a fluid outlet. In this case the fluid flow through the flow control valve 1 is reversed as compared to the situation described above.

The second housing part 3 is attached directly to the first housing part 2, a gasket 8 ensuring that the connection between the first housing part 2 and the second housing part 3 is substantially tight. The first housing part 2 and the second housing part 3 thereby form a substantially closed housing, the housing defining an interior part, and the housing defining an outer boundary of the flow control valve 1.

The interior part of the housing formed by the housing parts 2, 3 accommodates a frame part 9. A lead nut 10 is slidably arranged in a central cavity 11 of the frame part 9, and mating protrusions and recesses (not visible in FIGS. 1-3) prevent the lead nut 10 from performing rotational movements relative to the frame part 9. A spindle 12 is threadedly connected to the lead nut 10. A valve element 13 is mounted on an end part of the lead nut 10. A stepper motor 14 is connected to the spindle 12 in such a manner that operating the stepper motor 14 causes the spindle 12 to perform rotational movements, the stepper motor 14 being mounted on the frame part 9.

An opening degree of the flow control valve 1 is controlled in the following manner. When it is desired to change the opening degree of the flow control valve 1, the stepper motor 14 is activated, thereby causing the spindle 12 to perform a rotational movement. Since the spindle 12 is threadedly connected to the lead nut 10, and since the lead nut 10 is prevented from performing rotational movements relative to the frame part 9, the rotational movement of the spindle 12 causes the lead nut 10, and thereby the valve element 13, to perform a translational movement relative to the frame part 9. Accordingly, the valve element 13 is moved towards or away from the valve seat 7, depending on the direction of the rotational movement of the spindle 12. Thereby the passage defined at the connection port 6 is modified, thereby increasing or decreasing a mass flow of fluid through the connection port 6, i.e. increasing or decreasing the opening degree of the flow control valve 1.

In FIG. 1 the lead nut 10 is shown in a position which arranges the valve element 13 as far away from the valve seat 7 as possible. Thereby the fluid passage defined at the connection port 6 is as large as possible, i.e. the opening degree of the flow control valve 1 is as large as possible, and the flow control valve 1 is in a fully open position.

In FIG. 2 the lead nut 10 has been moved to a position which arranges the valve element 13 closer to the valve seat 7. The fluid passage defined at the connection port 6 has thereby been decreased, though still allowing fluid to pass. Thus the opening degree of the flow control valve 1 has been decreased, and the flow control valve 1 is in a partly open position.

In FIG. 3 the lead nut 10 has been moved even further in the direction towards the valve seat 7, thereby arranging the valve element 13 in abutment with the valve seat 7. Accordingly, fluid is prevented from passing the connection port 6, i.e. the flow control valve 1 is in a fully closed position.

The second housing part 3 is provided with a connector part 15 establishing electrical connections from the exterior of the housing to an interior part of the housing, thereby supplying power to the stepper motor 14.

The frame part 9 is attached to the second housing part 3. Thereby the frame part 9, along with the lead nut 10, the spindle 12, the valve element 13 and the stepper motor 14 mounted thereon, can be mounted on the second housing part 3 during the assembly process of the flow control valve 1. Subsequently, the second housing part 3, along with the frame part 9 and the elements 10, 12, 13, 14, mounted thereon is attached to the first housing part 2. Thus, during the final assembly step, only two main parts, i.e. the first housing part 2 and the second housing part 3, need to be attached to each other. This makes the assembly process easy and reduces the risk of errors.

Figure 4:
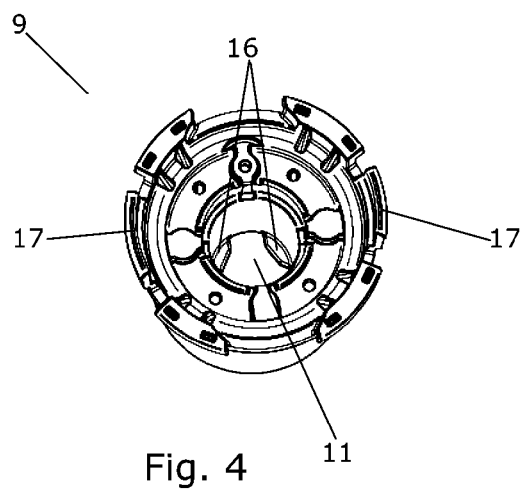
FIG. 4 is a perspective view of a frame part for use in the flow control valve of FIGS. 1-3.

FIG. 4 is a perspective view of a frame part 9 for use in the flow control valve 1 of FIGS. 1-3. The central cavity 11 is clearly visible. Three protrusions 16, two of which are visible, are arranged in the central cavity 11. The protrusions 16 are adapted to engage with corresponding recesses formed on a lead nut. Thereby relative rotations between the frame part 9 and a lead nut arranged in the central cavity 11 are prevented.

The frame part 9 is also provided with two snap fit portions 17 adapted to form part of a snap fit connection between the frame part 9 and the second housing part.

Figure 5:
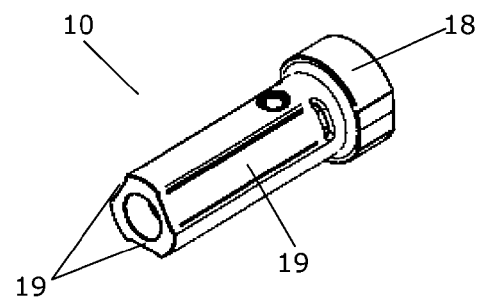
FIG. 5 is a top view of a lead nut for use in the flow control valve of FIGS. 1-3.

FIG. 5 is a perspective view of a lead nut 10 for use in the flow control valve 1 of FIGS. 1-3. The lead nut 10 is provided with a head portion 18 which is adapted to carry a valve element. The lead nut 10 is further provided with three recesses 19, each of the recesses 19 extending substantially along the length of the lead nut 10, except for the region accommodating the head portion 18.

The lead nut 10 can be inserted into the central cavity 11 of the frame part 9 shown in FIG. 4 with the recesses 19 arranged at positions corresponding to the positions of the protrusions 16. When the lead nut 10 is arranged in the central cavity 11 in this manner, relative rotational movement between the frame part 9 and the lead nut 10 is prevented, but relative translational movement between the frame part 9 and the lead nut 10 is allowed along a longitudinal direction defined by the central cavity 11.

Figure 6:
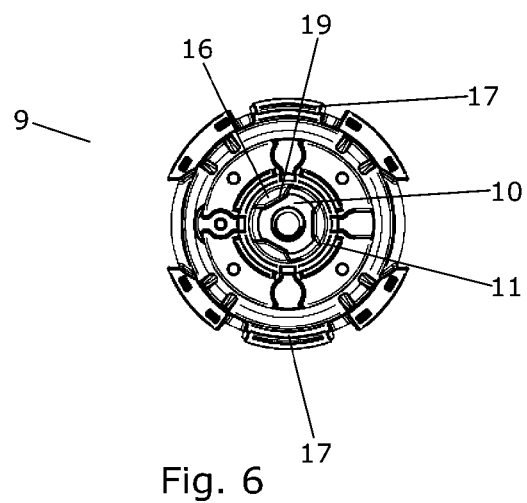
FIG. 6 is an end view of the frame part of FIG. 4 with the lead nut of FIG. 5 arranged in a central cavity thereof.

FIG. 6 is a top view of the frame part 9 of FIG. 4 with the lead nut 10 of FIG. 5 arranged in the central cavity 11 thereof, in the manner described above. It is clear that the recesses 19 and the protrusions 16 are arranged at corresponding positions, thereby allowing them to engage pair-wise.

Figure 7:
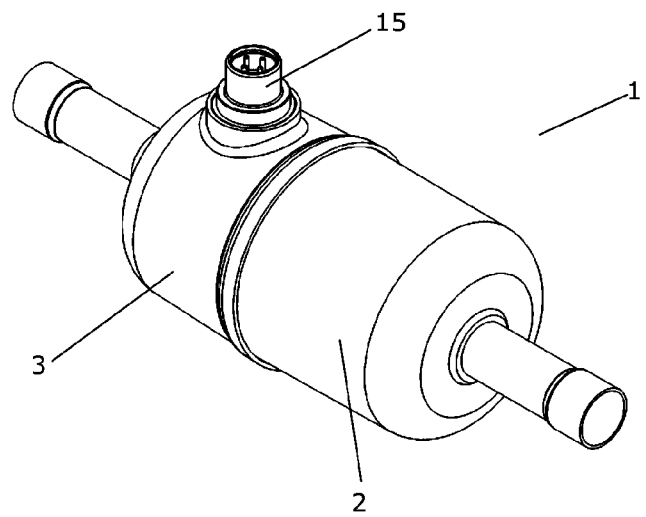
FIG. 7 is a perspective view of a flow control valve according to a second embodiment of the invention.

FIG. 7 is a perspective view of a flow control valve 1 according to a second embodiment of the invention. Similarly to the embodiment shown in FIGS. 1-3, the flow control valve 1 of FIG. 7 is provided with a first housing part 2 and a second housing part 3, the first housing part 2 and the second housing part 3 being attached to each other in such a manner that a substantially closed housing is formed, the housing defining an outer boundary of the flow control valve 1.

The second housing part 3 is provided with a connector part 15 which establishes electrical connections between the interior of the housing and the exterior, thereby allowing power supply to power consuming components arranged in the interior of the housing.

Figure 8:
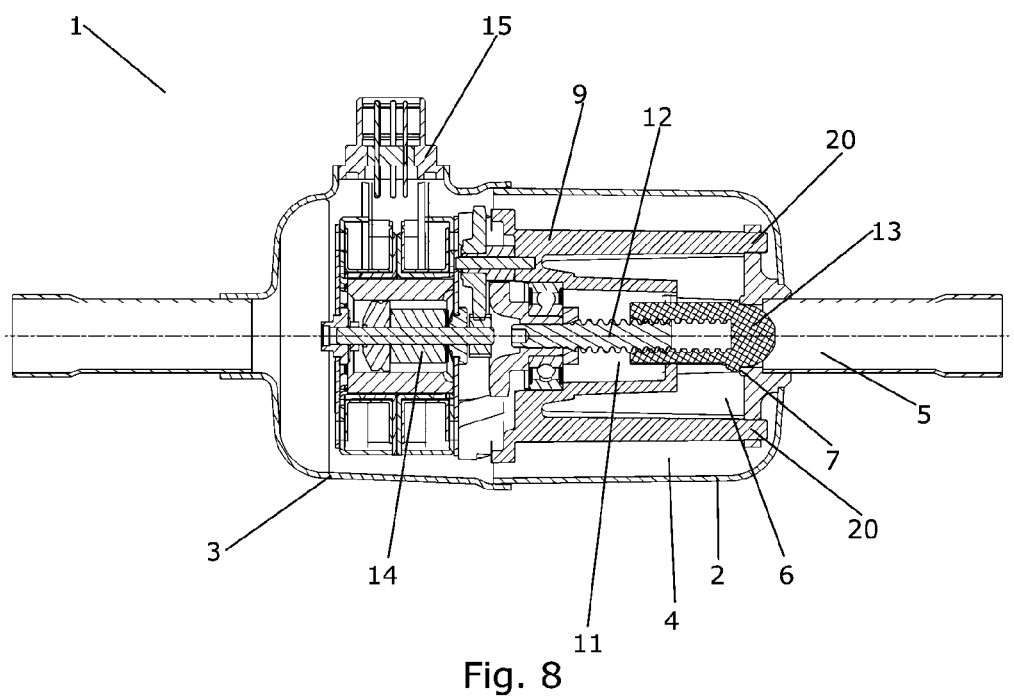
FIG. 8 is a cross sectional view of the flow control valve of FIG. 7.

FIG. 8 is a cross sectional view of the flow control valve 1 of FIG. 7. The first housing part 2 defines a first flow section 4 and a second flow section 5. Fluid can flow from the first flow section 4 to the second flow section 5, or vice versa, via a connecting port 6, subject to the position of a valve element 13 as will be described below. A valve seat 7 is arranged at the connecting port 6.

A frame part 9 is arranged in an interior part of the housing formed by the first housing part 2 and the second housing part 3. A spindle 12 is arranged in an inner cavity 11 of the frame part 9, the spindle 12 being connected to a stepper motor 14 in such a manner that the stepper motor 14 is capable of causing the spindle 12 to perform rotational movements. The connector part 15 supplies power to the stepper motor 14.

A valve element 13 is threadedly connected to the spindle 12. The valve element 13 is prevented from performing rotational movements relative to the frame part 9. Thus, when the spindle 12 rotates, the valve element 13 performs translational movements along a longitudinal axis defined by the spindle 12, towards or away from the valve seat 7, depending on the direction of the rotational movement of the spindle 12. Accordingly, the fluid passage defined at the valve seat 7, and thereby the opening degree of the flow control valve 1, can be controlled by rotating the spindle 12 by means of the stepper motor, similar to the situation described above with reference to FIGS. 1-3. In FIG. 8 the valve element 13 is arranged in abutment with the valve seat 7, i.e. the flow control valve 1 is in a fully closed position.

The spindle 12 and the stepper motor 14 are mounted on the frame part 9, and the frame part 9 is mounted on the first housing part 2 via connections 20. Thus, during assembly of the flow control valve 1, the spindle 12, the valve element 13 and the stepper motor 14 are initially mounted on the frame part 9. The frame part 9, along with these components 12, 13, 14, is then mounted on the first housing part 2. Finally, the first housing part 2, along with the frame part 9 and the components 12, 13, 14 mounted thereon, is attached to the second housing part 3. Thus, similarly to the situation described above with reference to FIGS. 1-3, the final assembly step is very simple, and the risk of errors during the assembly is therefore minimised.

Figure 9:
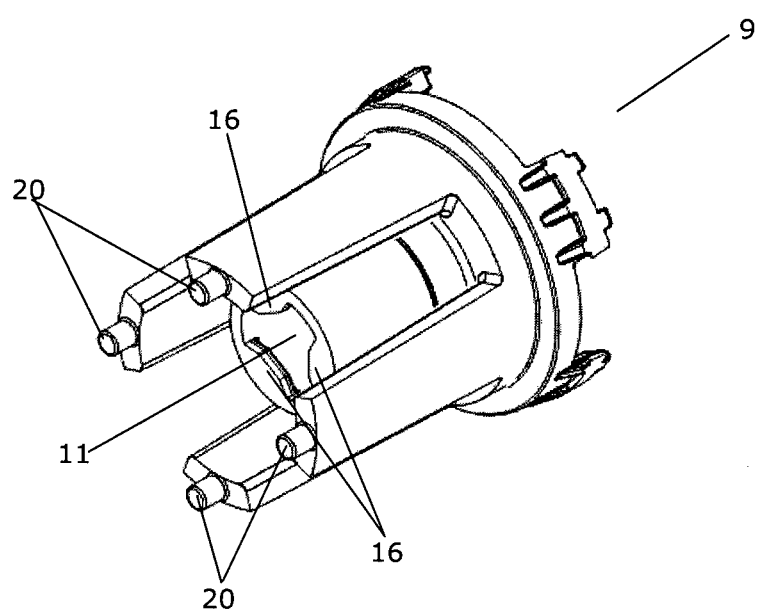
FIG. 9 is a perspective view of a frame part for use in the flow control valve of FIGS. 7 and 8.

FIG. 9 is a perspective view of a frame part 9 for use in the flow control valve 1 of FIGS. 7 and 8. In FIG. 9 it can be seen that the central cavity 11 of the frame part 9 is provided with three protrusions 16 which are adapted to engage corresponding recesses formed on the valve element (13 in FIG. 8) when the valve element 13 is arranged in the central cavity 11. Thereby the valve element 13 is prevented from performing rotational movements relative to the frame part 9.

Although various embodiments of the present invention have been described and shown, the invention is not restricted thereto, but may also be embodied in other ways within the scope of the subject-matter defined in the following claims.

The invention claimed is:

1. A flow control valve comprising:
    a first housing part defining a first flow section, a second flow section, a connecting port fluidly interconnecting the first flow section and the second flow section, and a valve seat formed in the first housing part and arranged at the connecting port,
    a second housing part being attached directly to the first housing part, in such a manner that the first housing part and the second housing part form a substantially closed housing having an interior part formed by the first housing part and the second housing part,
    a frame part arranged in the interior part of the housing and attached directly to the first housing part or to the second housing part, the frame part having mounted entirely thereon to carry, thereby forming a single unit, each of:
        a movable valve element arranged movably relative to the valve seat,
        a moving mechanism for moving the valve element, and
        an actuating mechanism for operating the moving mechanism, and
    means for preventing relative rotational movements between the frame part and the valve element,
    wherein the frame part defines a central cavity and a peripheral cavity,
    wherein the moving mechanism is at least partly accommodated in the central cavity of the frame part, and the movable valve element is at least partly accommodated in the peripheral cavity of the frame part,
    wherein the moving mechanism is adapted to convert a rotational movement of the actuating mechanism into a translational movement of the valve element,
    wherein the means for preventing relative rotational movements between the frame part and the valve element is arranged in the peripheral cavity and comprises mating protrusions and recesses formed on the frame part and the movable valve element, respectively.

2. The flow control valve according to claim 1, further comprising a connector part establishing electrical connections between an interior part of the housing and the exterior of the housing.

3. The flow control valve according to claim 2, wherein the connector part is helium leak tight.

4. The flow control valve according to claim 1, wherein the frame part and the first or second housing part are attached to each other by means of a snap fit connection.

5. The flow control valve according to claim 1, wherein the actuating mechanism comprises a stepper motor.

6. The flow control valve according to claim 1, wherein the moving mechanism comprises a spindle with a threaded portion, said threaded portion being adapted to engage a mating threaded portion arranged on a part of the valve element.

7. The flow control valve according to claim 1, wherein the second housing part is releasably attached to the first housing part.

8. A method for assembling a flow control valve, the method comprising the steps of:
    providing a first housing part defining a first flow section, a second flow section, a connecting port fluidly interconnecting the first flow section and the second flow section, and a valve seat formed in the first housing part and arranged at the connecting port,
    providing a frame part,
    mounting a movable valve element, a moving mechanism for moving the valve element, and an actuating mechanism for operating the moving mechanism entirely on the frame part to form a single unit comprising the frame part carrying the movable valve element, moving mechanism and actuating mechanism,
    attaching the first housing part or a second housing part to the frame part, and
    attaching the first housing part and the second housing part to each other in such a manner that a substantially closed housing is formed, and in such a manner that the frame part along with the movable valve part, the moving mechanism and the actuating mechanism are arranged in an interior part of the housing.

9. The method according to claim 8, further comprising a step of fixing the frame part to a manufacturing table prior to performing the mounting step, and wherein the mounting step is performed while the frame part is fixed to the manufacturing table.

10. The method according to claim 8, wherein the mounting step further comprises mounting a connector part on the frame part, said connector part establishing electrical connections between an interior part of the housing and the exterior of the housing.

11. The flow control valve according to claim 2, wherein the frame part and the first or second housing part are attached to each other by means of a snap fit connection.

12. The flow control valve according to claim 3, wherein the frame part and the first or second housing part are attached to each other by means of a snap fit connection.

* * * * *